Oct. 22, 1957  R. A. JONES ET AL  2,810,454
ARGON PURIFICATION
Filed Dec. 24, 1953
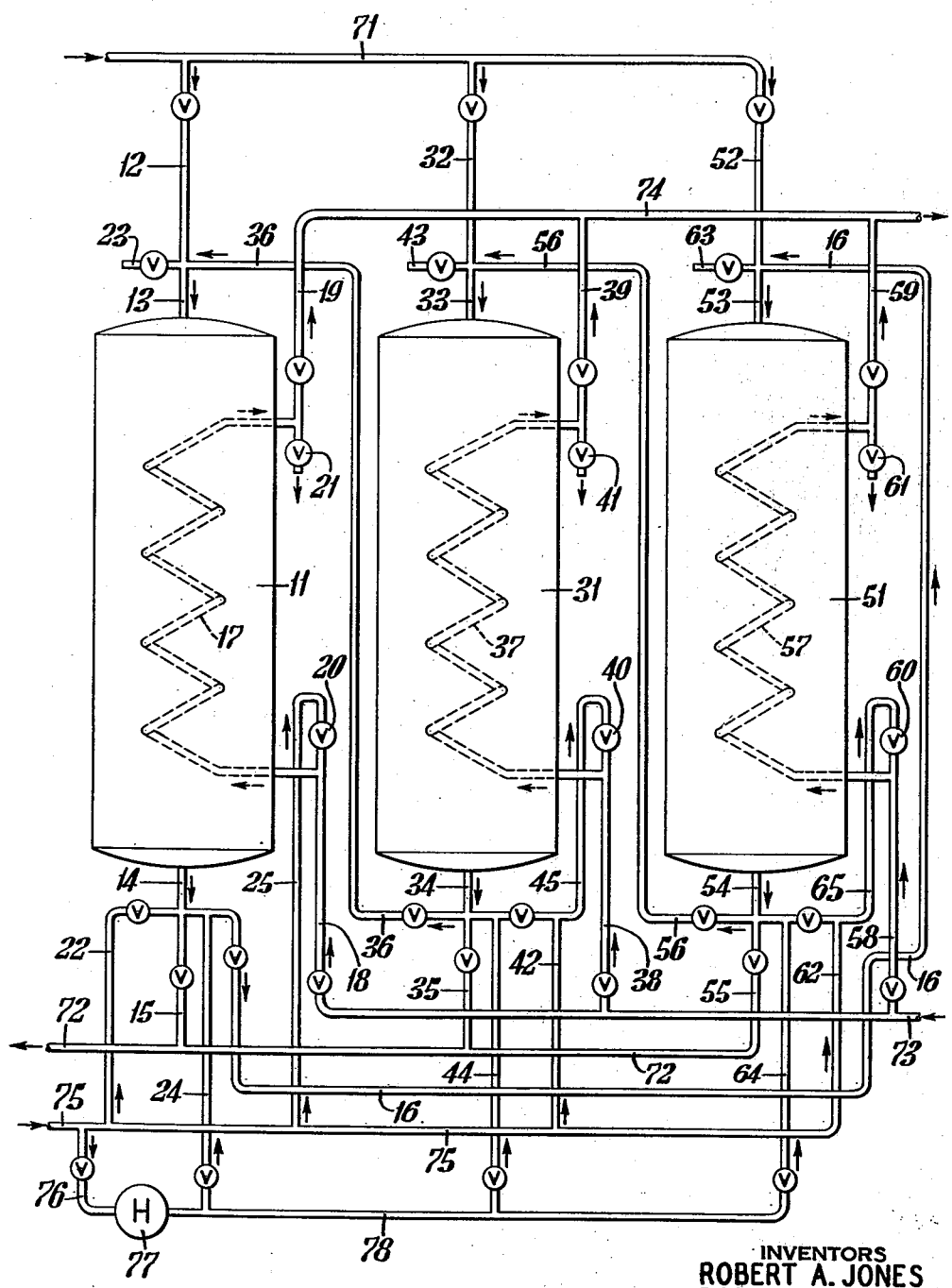
INVENTORS
ROBERT A. JONES
ROBERT M. MILTON
BY *Jackson B. Browning*
ATTORNEY United States Patent Office 2,810,454
Patented Oct. 22, 1957

2,810,454

ARGON PURIFICATION

Robert A. Jones and Robert M. Milton, Buffalo, N. Y., assignors to Union Carbide Corporation, a corporation of New York Application December 24, 1953, Serial No. 400,340

19 Claims. (Cl. 183—114.2)

The invention relates to the purification of argon and more particularly to the removal of oxygen from argon.

Argon is widely used in electric arc welding to shield hot metal from oxygen or nitrogen and thus to minimize oxidation or nitriding. Conventionally, liquid air is the source of argon. By means of a series of rectifications of liquid air a gas is produced which is rich in argon but still contains undesirable quantities of oxygen and nitrogen. Further rectification will remove nitrogen, but it is difficult to separate oxygen and argon completely because of their close boiling points.

According to the prior art, residual oxygen is removed from the argon-oxygen mixture, for example, either by consuming the oxygen in the burning of hydrogen or sulfur or by passing the argon-oxygen mixture over hot copper or by a combination of these methods. All of these methods have certain disadvantages. Where hydrogen or sulfur is used the expense of the materials must be borne, and either water or sulfur dioxide must be removed from the argon. The precise amount of hydrogen or sulfur has to be used to consume the oxygen else the oxygen is not completely removed or the argon may be otherwise contaminated. Where the hot copper technique is used the argon-oxygen mixture must be heated from the low temperature (—150° C. or —185° C.) at which rectification is practiced to a temperature of about 300° C. to 450° C. at which copper and oxygen unite to form copper oxide.

The principal object of the invention is to provide an improved process for the purification of argon. A further object is to provide a process for the purification of argon which permits the efficient separation of argon from contaminants. Still another object is to provide a process for the purification of argon which process employs adsorbents. Still another object is to provide an adsorption process for the separation of argon and oxygen.

These objects are accomplished by employing as an adsorbent a molecular sieve having properties which will be described more particularly below. In general the molecular sieve used in the process of the invention is a dehydrated sodium-aluminum-silicate belonging to the zeolite family and designated herein as sodium zeolite A. The sodium zeolite A is dehydrated conveniently by subjecting it to vacuum, heat, or both. In a preferred treatment the material is heated at 350° C. under a pressure of 1 millimeter of mercury to remove the retained water. With this adsorbent, oxygen and certain other gases may be separated from argon at temperatures approximating the gas-liquid equilibrium temperature of oxygen. Thus the process of the invention permits the separation of the cold argon-oxygen mixture obtained from the rectification of liquid air. The mixture is passed through the adsorbent which removes substantially all of the oxygen but passes the argon. This separation can be effected with a relatively insignificant increase in the temperature of the elements in the mixture.

The process of the invention will be illustrated by a description of its use in the production of argon suitable for welding. Reference will be made to the drawing to facilitate the explanation of the process.

In the drawing a diagram of apparatus suitable for use in carrying out the process of the invention is shown.

The apparatus represented in the drawing consists essentially of three chambers or oxygen traps, 11, 31, 51, and the piping and valves necessary to effect the flow of materials in the process of the invention. A supply of relatively impure argon is provided, as for example, from liquid air rectification columns. The argon supplied is conveniently of the same purity and composition as the gas from which, according to the prior art, oxygen is removed by burning or the like. Thus a typical analysis would be: not more than 0.08% nitrogen, up to about 14% oxygen, balance substantially all argon.

The pipe 71 conducts the impure argon gas toward one or more of the adsorbent chambers or oxygen traps, 11, 31, and 51. The traps 11, 31, and 51 are connected to the line pipe 71 by valved pipes 12, 32, and 52, respectively, and 13, 33 and 53, respectively. The traps 11, 31 and 51 contain as an adsorbent, crystalline sodium zeolite A, suitably in the form of pellets. After passing through the adsorbent in the traps, the purified argon gas leaves the traps through valved pipes 14, 34, and 54 and 15, 35, and 55 from which the gas may be sent to a collection line 72. The gas may also be diverted through valved pipes 16, 36, and 56, each of which is connected to the pipes 53, 13, and 33, respectively, whereby any trap may be connected in parallel with or in series with an adjacent trap or be cut out of the system entirely for cleaning, desorbing or other purposes.

Heat is generated in the traps during the adsorption of oxygen. To maintain the low temperature, a refrigerant is passed through a supply pipe 73 to heat-exchange pipes 17, 37, and 57 within the respective traps and preferably buried in the adsorbent. Controlled passage of the refrigerant from the supply pipe 73 to the heat exchange pipes is through the valved connecting pipes 18, 38, and 58. A suitable source of refrigerant is a liquid from one of the rectification columns of an air separation process. Then the liquid may vaporize in the heat exchange pipes and, in the form of gas, be conducted by valved pipes 19, 39, and 59 from the exit ends of the heat exchange pipes 17, 37, and 57, respectively, to a collector pipe 74 which conducts the heated fluid away.

During desorption it is desirable to raise the temperature of the adsorbent above the adsorption temperature. This may be done in any suitable manner but is preferably accomplished by passing a heating fluid from pipe 75 through the valves 20, 40, and 60, into the pipes 17, 37, and 57, and to the outlet valves 21, 41, and 61. A convenient heating fluid in most instances is waste nitrogen from air separation apparatus. This nitrogen is relatively warm having a temperature of up to about 80° C. The nitrogen from the valves 21, 41, and 61 may be wasted to the atmosphere or fed to heat exchangers (not shown) for use, for example, in the cooling of atmospheric air as it is taken into an air separation system, In addition to, or instead of, effecting desorption of oxygen by heating the adsorbent with heating fluid in pipes 17, 37, and 57, a gas may be passed through the adsorbent to effect or accelerate the desorption. This gas, preferably warmed, distributes heat evenly and quickly throughout the adsorbent mass. Again waste nitrogen from air separation apparatus is a convenient source of heat. It is preferably used at a temperature of about 80° C. and has the advantage of being absolutely dry, thus preventing water from entering the pores of the adsorbent. The gas, after heating if necessary, is forced into the sorption system by a blower (not shown) through pipe 75. From pipe 75 the gas passes through valved pipes 22, 42, and 62. Pipes 14, 34, and 54 conduct the gas to the appropriate adsorbent chamber. The gas passes out of the chambers by the pipes 13, 33, and 53 and the valved outlet pipes 23, 43 and 63. Helium or other gas which is displaced from the adsorbent by oxygen may be used to purge the nitrogen from the chambers. The helium enters the system through valved pipe 75 and thereafter flows through pipes 22, 42, and 62, pipes 14, 34, and 54, the adsorbent, pipes 13, 33, and 53 and pipes 23, 43, and 63.

From time to time, for instance if water vapor or other contaminant accidentally gets into the trap, it may be necessary to regenerate the adsorbent as distinguished from desorbing it. Regeneration frequently requires a rather high heat sometimes in the neighborhood of 350° C. In order to obtain such a heat conveniently, gas is taken from pipe 75 through valved pipe 76, a heater 77, and pipe 78. The heated gas is then conducted through valved pipes 24, 44, and 64 and pipes 14, 34, and 54 to traps 11, 31, and 51, respectively. Thus gas at substantially any temperature above normal may be passed into any of the traps by means of the valves and pipes shown in the drawing.

The adsorbent, sodium zeolite A, used in the process of the invention is described in detail in copending application, Serial No. 400,388, filed December 24, 1953. A method of making the adsorbent is disclosed in the same application. Sodium zeolite A (Na₂A) has the following formula:

$$1.0 \pm 0.2 Na_2O : 1 Al_2O_3 : 1.85 \pm 0.5 SiO_2 : YH_2O$$

In this formula "Y" in the completely dehydrated form of the adsorbent is essentially zero. The fully hydrated form of the adsorbent has a "Y" value of about 5.1. Sodium zeolite A, fully hydrated, has an apparent density of between 1.89 and 2.09 grams per cubic centimeter and a cubic unit cell in which $a_0$ equals about 12.3 A.

The X-ray powder diffraction pattern has been found to be a useful tool in identifying sodium zeolite A. In obtaining the X-ray diffraction powder pattern given below, standard techniques were employed. The radiation was the Kα doublet of copper, and a Geiger counter spectrometer with a strip chart pen recorder was used. The peak heights, I, and the positions as a function of 2θ, where θ is the Bragg angle, were read from the spectrometer chart. From these, the relative intensities, $$\frac{100 I}{I_0}$$

where $I_0$ is the intensity of the strongest line or peak and $d$(obs), the interplanar spacing in A., corresponding to the recorded lines were calculated.

X-ray powder diffraction data for sodium zeolite A (Na₂A) is given in Table A. The table lists the $100I/I_0$ and the $d$ values in A. for the observed line. The X-ray patterns indicate a cubic unit cell of $a_0$ of about 12.3 A. In a separate column are listed the sum of the squares of the Miller indices $(h^2+k^2+l^2)$ for a cubic unit cell corresponding to the observed lines in the X-ray diffraction patterns. The $a_0$ value and the estimated errors in reading the position of an X-ray peak on the spectrometer chart, are also tabulated.

TABLE A

| $(h^2+k^2+l^2)$ | Na₂A | | Estimated Error in $d$ Value |
|---|---|---|---|
| | $d$(obs) | 100 $I/I_0$ | |
| 1 | 12.29 | 100 | ±0.02 |
| 2 | 8.71 | 69 | ±0.02 |
| 3 | 7.11 | 35 | ±0.01 |
| 5 | 5.51 | 25 | ±0.01 |
| 6 | 5.03 | 2 | ±0.01 |
| 8 | 4.36 | 6 | ±0.01 |
| 9 | 4.107 | 36 | ±0.004 |
| 11 | 3.714 | 53 | ±0.003 |
| 13 | 3.417 | 16 | ±0.003 |
| 14 | 3.293 | 47 | ±0.002 |
| 17 | 2.987 | 55 | ±0.002 |
| 18 | 2.904 | 9 | ±0.002 |
| 20 | 2.754 | 12 | ±0.002 |
| 21 | 2.688 | 4 | ±0.002 |
| 22 | 2.626 | 22 | ±0.002 |
| 24 | 2.515 | 5 | ±0.002 |
| 25 | 2.464 | 4 | ±0.002 |
| 27 | 2.371 | 3 | ±0.002 |
| 29 | 2.289 | 1 | ±0.002 |
| 30 | 2.249 | 3 | ±0.002 |
| 32 | 2.177 | 7 | ±0.002 |
| 33 | 2.144 | 10 | ±0.001 |
| 34 | 2.113 | 3 | ±0.001 |
| 35 | 2.083 | 4 | ±0.001 |
| 36 | 2.053 | 9 | ±0.001 |
| 41 | 1.924 | 7 | ±0.001 |
| 42 | 1.901 | 4 | ±0.001 |
| 44 | 1.858 | 2 | ±0.001 |
| 45 | 1.837 | 3 | ±0.001 |
| 49 | 1.759 | 2 | ±0.001 |
| 50 | 1.743 | 13 | ±0.001 |
| 53 | 1.692 | 6 | ±0.001 |
| 54 | 1.676 | 2 | ±0.001 |
| 57 | 1.632 | 4 | ±0.001 |
| 59 | 1.604 | 6 | ±0.001 |
| 61 | 1.577 | 4 | ±0.001 |
| 65 | 1.528 | 2 | ±0.001 |
| 66 | 1.516 | 1 | ±0.001 |
| 69 | 1.483 | 3 | ±0.001 |
| 70 | 1.473 | 2 | ±0.001 |
| 74 | 1.432 | 3 | ±0.001 |
| 75 | 1.422 | 2 | ±0.001 |
| 77 | 1.404 | 5 | ±0.001 |
| 81 | 1.369 | 2 | ±0.001 |
| 82 | 1.360 | 8 | ±0.001 |
| $a_0$ | 12.32 ±0.02 | | |

The more significant $d$ values for sodium zeolite A are given in Table B.

TABLE B $d$ Value of reflection in A.

12.3±0.2
8.7±0.15
7.11±0.15
5.51±0.10
4.11±0.08
3.71±0.07
3.42±0.06
3.29±0.05
2.99±0.05
2.75±0.05
2.63±0.05

Zeolite A may be defined as a synthetic crystalline alumino-silicate having an X-ray powder diffraction pattern characterized by at least those reflections set forth in either Table A or Table B.

The process of the invention when operated with the apparatus illustrated in the drawing yields a final product of purified argon which may contain not more than about 0.001% of oxygen by volume. The gas entering the traps preferably contains not more than about 14 parts of oxygen nor more than about 0.08 part of nitrogen per 100 parts of argon. The gas is preferably under a pressure of about 5 p. s. i. above atmospheric and at a temperature of below about −165° C., preferably between about −165° C. and −180° C. The nitrogen content of the gas is not significantly reduced by the process of the invention. More than 0.1% of nitrogen in the gas tends to cut down the efficiency of the process. While relatively large quantities of oxygen may be removed by the adsorbent it is generally desirable to remove most of the oxygen by rectifying columns and use the adsorbent to remove the last small quantities. Preferably, the pressure is maintained above atmospheric to prevent leaks into the system. The process is operable at pressures substantially above or below atmospheric. Good results have been obtained with an adsorbent temperature and a gas temperature of up to about −100° C. The pressure must be adjusted so that at the operating temperature the elements in the system are in the gaseous state. With the pressure adjusted to insure gaseous materials, operating temperatures of −200° C. or lower are permissible.

A preferred manner of operating the three trap system illustrated in the drawing is as follows: The gas from pipe 71 is passed through the first trap 51, traps 11 and 31 being cut out. The gas which first comes through the trap and out of pipe 54 is fed into pipe 72 and contains no, or only a very faint trace of, oxygen unless the gas is forced through the trap too fast. In the latter case the flow of gas should be decreased or a larger body of adsorbent should be used. The gas from the trap contains substantially all of the nitrogen in the feed gas. After a time, depending upon the rate of flow of the gas, the amount of oxygen in the gas passing into the trap, and the amount of adsorbent in the trap, traces of oxygen are found in the effluent gas. Unless the rate of flow of the gas is decreased to afford a longer time of contact between the gas and the adsorbent, the quantity of oxygen in the effluent gas continues to increase as the gas continues to flow and the adsorbent becomes more and more loaded with oxygen. When the amount of oxygen in the effluent gas reaches the permissible limit, the valves on the effluent side of the trap are changed to block the passage of the effluent into pipe 72 and to send the effluent from trap 51 to the inlet of trap 31. At the same time the valves on the effluent side of trap 31 are operated to send the effluent from trap 31 into pipe 72.

The amount of oxygen in the effluent from trap 51 will continue to increase until the adsorbent is fully loaded with oxygen. At that time the composition of the effluent will be the same as that of the feed from pipe 71 whereupon the flow of gas from pipe 71 into trap 51 is blocked, and gas is fed directly from pipe 71 into trap 31. When trap 31 first comes on stream (processing the effluent from trap 51) its effluent contains no, or only a very faint trace of, oxygen. But the oxygen content gradually increases as did the oxygen content of the effluent from trap 51. When the oxygen content of the effluent from trap 31 reaches the permissible limit, trap 11 is placed in series with trap 31 and passage of the effluent from trap 31 to the pipe 72 is blocked. The outlet from trap 11 into pipe 72 is then opened.

When trap 51 is taken off stream it is desorbed of oxygen. This may be accomplished either by heating the adsorbent to the point where there is little or no tendency for the adsorbent to retain oxygen or by creating a vacuum in the trap, or both. The use of a vacuum is somewhat undesirable because should there be any leaks in the system, contaminating air carrying water vapor and other contaminating gases might enter the trap. Heat alone is also somewhat undesirable because the high temperature involved necessitates refrigeration to cool the heated adsorbent again to its operating temperature. Furthermore, if oxygen remains in the trap as the adsorbent is cooled, the oxygen is adsorbed diminishing the capacity of the adsorbent.

To obviate these difficulties, the adsorbent is desorbed by passing heating fluid through the heat exchange pipe 57 and also by passing a hot desorbing gas through the adsorbent. The desorbing gas is one that is not appreciably adsorbed by the adsorbent at the desorbing temperature. Nitrogen at about 80° C. is satisfactory for use as both the heating fluid and the desorbing gas. For desorbing trap 51, the path of the warm nitrogen is through pipes 75, 62, 54, 53, and 63. A portion of the nitrogen in pipe 62 passes through pipe 65, valve 60, pipe 57, and valve 61, pipes 58 and 59 being blocked.

The adsorbent is heated to a temperature of about 50° C. By the time that the entire mass of adsorbent reaches this temperature, the atmosphere in the trap is substantially pure nitrogen and the oxygen has been substantially completely desorbed. At the time that the adsorbent is saturated with oxygen and taken off stream, at the end of the adsorption period, the adsorbent holds oxygen on the average to the extent of about 5 to 10 percent by weight of saturated adsorbent at −180° C. When the desorption in nitrogen gas is finished the oxygen content is less than 1 part oxygen per 100 parts of desorbed adsorbent.

Having thoroughly desorbed the oxygen from the adsorbent, the adsorbent is recooled to its adsorbing or operating temperature. If cooled, in an atmosphere of pure nitrogen, the adsorbent will adsorb some nitrogen. This nitrogen, once adsorbed, is not readily removed from the adsorbent and diminishes the capacity of the adsorbent for oxygen at the operating temperature. It has been found that if the nitrogen is purged from the trap by helium, and the adsorbent is cooled to its operating temperature in an atmosphere of substantially pure helium, very little helium is adsorbed by the adsorbent. The helium that is adsorbed does not interfere to any significant extent with the adsorption of oxygen from the feed mixture. For the purpose of cooling the adsorbent, other gases with boiling points of −240° C. or below, for instance neon and hydrogen, are satisfactory. Helium is the preferred cooling gas where the argon is to be used in welding since a relatively small amount of helium in the gas does no harm in the welding of most metals. Helium or its equivalent could be used as the desorbing gas but helium is costly as compared with nitrogen and consequently nitrogen is preferred as the desorbing gas and helium as the cooling gas. The helium is run into the trap while the trap, adsorbent and helium are hot because for best results there should be no cooling of the adsorbent below about 25° C. in the presence of any substantial quantity of nitrogen. For purging nitrogen and cooling the traps, as soon as the gas flowing out of the traps shows that all or substantially all of the oxygen has been removed, the flow of nitrogen is stopped, and the flow of helium is begun. The flow of helium is continued until the effluent shows that all or substantially all of the nitrogen has been purged. The trap is kept open to the helium supply so that only helium can enter the trap as the trap is cooled. The trap is further cooled by cooling medium supplied through heat exchange pipe 57. When the trap and adsorbent are down to operating temperature the helium supply is stopped, and the trap 51 is ready to go on indirect stream in series with trap 11. After going on indirect stream, the trap 51 will for a short time pass argon containing some helium or such other gas as was used for cooling. An alternate method of removing the purge nitrogen from the warm traps of adsorbent is to pass crude argon through the traps until essentially all of the nitrogen has been removed. If desired this argon may be removed by purging with helium prior to cooling. During cooling helium is added to the trap to maintain a positive pressure.

Following the procedure just described, each trap in turn may be put indirectly on stream, then directly on stream, then cut off and desorbed and then again put indirectly on stream. Any number of traps may be used and, if more than one, they may be used in series as described or simultaneously or successively in parallel or in any desired combination.

Certain materials, for example water, that may be adsorbed by the adsorbent will not be removed by the desorption process outlined above. When these materials are present the adsorbent is regenerated rather than desorbed. The regeneration may be effected in the same manner as the desorption except that the trap and adsorbent are heated to a much higher temperature, for example, up to 350° C., in the presence of nitrogen. For regenerating the adsorbent, nitrogen is passed through pipe 76, through high temperature heater 77, through pipe 64, and through pipe 54 into the trap. It is essential that the dehydrated sodium zeolite A used in the process of the invention carry no more than about 3% by weight of water during the desorption. Preferably about 1% or less water by weight of adsorbate is present.

The purification of argon is greatly simplified by the invention herein disclosed. At a temperature of about —183° C. and a pressure of about 700 mm. of mercury, 22.2% of oxygen and 1.5% argon by weight of adsorbate is adsorbed in zeolite A. The argon which comes through the trap in the preferred embodiment of the process is substantially free from oxygen or other contaminants and is ready for use in welding, or other processes requiring pure argon, without additional treatment. It will of course be understood that the process of the invention is not limited to the apparatus shown in the drawing but may be performed with any suitable equipment without departing from the scope of the invention.

What is claimed is:

1. A method of separating oxygen from a mixture of oxygen and argon which comprises providing a quantity of dehydrated sodium zeolite A, a crystalline sodium-aluminum-silicate having an arrangement of atoms such that the crystal's X-ray powder diffraction pattern is essentially the same as that tabulated in Table A, bringing said oxygen and argon into intimate contact with said sodium zeolite A, and preferentially adsorbing oxygen from said mixture.

2. A method of separating oxygen and argon which comprises providing a quantity of dehydrated sodium zeolite A, a crystalline sodium-aluminum-silicate having an arrangement of atoms such that the crystal's X-ray powder diffraction pattern is essentially the same as that tabulated in the following table:

*d Value of reflection in A.*

12.3 ±0.2
8.7 ±0.15
7.11±0.15
5.51±0.10
4.11±0.08
3.71±0.07
3.42±0.06
3.29±0.05
2.99±0.05
2.75±0.05
2.63±0.05 where the $d$ values are the interplanar spacing in A., bringing said oxygen and argon into intimate contact with said sodium zeolite A, and preferentially adsorbing the oxygen.

3. A method of separating oxygen and argon which comprises providing a quantity of dehydrated sodium zeolite A, bringing said oxygen and argon into intimate contact with said sodium zeolite A, and preferentially adsorbing oxygen, said sodium zeolite A being a crystalline material having the following formula:

$$1.0 \pm 0.2 Na_2O : 1 Al_2O_3 : 1.85 \pm 0.5 SiO_2 : Y H_2O$$

wherein "Y" in the hydrated form may be any value up to about 5.1 and which in its fully hydrated form has a density of 1.99 gm./cc.±0.1 gm./cc.

4. A method of purifying argon containing up to 0.1 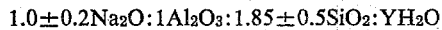 by volume of nitrogen and up to 14 parts by volume per 100 parts by volume of argon, which method 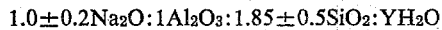 a quantity of dehydrated sodium 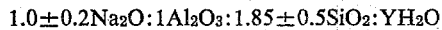-aluminum-silicate having 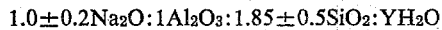 crystal's X-ray powder diffraction pattern is essentially the same as that tabulated in Table A, bringing said nitrogen, oxygen, and argon into intimate contact with said sodium zeolite A, and preferentially adsorbing the oxygen.

5. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table B, bringing said nitrogen, oxygen, and argon into intimate contact with said sodium zeolite A, and preferentially adsorbing the oxygen.

6. A method of purifying argon containing up to 0.1 part by volume of nitrogen and up to 14 parts by volume of oxygen per 100 parts by volume of argon, which method comprises providing a quantity of dehydrated sodium zeolite A, bringing said nitrogen, oxygen, and argon into intimate contact with said sodium zeolite A, and preferentially adsorbing the oxygen, said sodium zeolite A being a crystalline sodium-aluminum-silicate having a density of 1.99 gm./cc.±0.1 gm./cc. in its fully hydrated form and having the following formula:

$$1.0 \pm 0.2 Na_2O : 1 Al_2O_3 : 1.85 \pm 0.5 SiO_2 : Y H_2O$$

wherein "Y" in the hydrated form may be any value up to about 5.1.

7. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table A, bringing said nitrogen, oxygen, and argon into intimate contact with said sodium zeolite A while maintaining said sodium zeolite A at a temperature of below about —100° C. and said nitrogen, oxygen, and argon in a gaseous state, and preferentially adsorbing the oxygen.

8. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table B, bringing said nitrogen, oxygen, and argon into intimate contact with said sodium zeolite A while maintaining said sodium zeolite A at a temperature of below about —100° C. and said nitrogen, oxygen, and argon in a gaseous state, and preferentially adsorbing the oxygen.

9. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table B, bringing said nitrogen, oxygen, and argon into intimate contact with said sodium zeolite A while maintaining said sodium zeolite A at a temperature of below about —165° C. and said nitrogen, oxygen, and argon in a gaseous state, and preferentially adsorbing the oxygen.

10. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table B, bringing said nitrogen, oxygen, and argon into intimate contact with said sodium zeolite A while maintaining said sodium zeolite A at a temperature of between −165° C. and −180° C. and said nitrogen, oxygen, and argon in a gaseous state, and preferentially adsorbing the oxygen.

11. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table B, bringing said nitrogen, oxygen, and argon into intimate contact with said sodium zeolite A while maintaining said sodium zeolite A at a temperature of between −165° C. and −180° C. and said nitrogen, oxygen, and argon in a gaseous state under a pressure of not less than atmospheric, and preferentially adsorbing the oxygen.

12. A method of purifying argon containing up to 0.1 part by volume of nitrogen and up to 14 parts by volume of oxygen per 100 parts by volume of argon, which method comprises providing a quantity of dehydrated sodium zeolite A, bringing said nitrogen, oxygen and argon into intimate contact with said sodium zeolite A while maintaining said sodium zeolite A at a temperature of about −100° C. and the nitrogen, oxygen and argon in a gaseous state, and preferentially adsorbing oxygen, said sodium zeolite A being a crystalline material having the following formula:

$$1.0 \pm 0.2 Na_2O : 1 Al_2O_3 : 1.85 \pm 0.5 SiO_2 : YH_2O$$

wherein "Y" in the hydrated form may be any value up to about 5.1 and which in its fully hydrated form has a density of 1.99 gm./cc.±0.1 gm./cc.

13. A method of purifying argon containing up to 0.1 part by volume of nitrogen and up to 14 parts by volume of oxygen per 100 parts by volume of argon, which method comprises providing a quantity of dehydrated sodium zeolite A, bringing said nitrogen, oxygen and argon into intimate contact with said sodium zeolite A while maintaining said sodium zeolite A at a temperature of about −165° C. and the nitrogen, oxygen and argon in a gaseous state, and preferentially adsorbing oxygen, said sodium zeolite A being a crystalline material having the following formula:

$$1.0 \pm 0.2 Na_2O : 1 Al_2O_3 : 1.85 \pm 0.5 SiO_2 : YH_2O$$

wherein "Y" in the hydrated form may be any value up to about 5.1 and which in its fully hydrated form has a density of 1.99 gm./cc.±0.1 gm./cc.

14. A method of purifying argon containing up to 0.1 part by volume of nitrogen and up to 14 parts by volume of oxygen per 100 parts by volume of argon, which method comprises providing a quantity of dehydrated sodium zeolite A, bringing said nitrogen, oxygen and argon into intimate contact with said sodium zeolite A while maintaining said sodium zeolite A at a temperature of between −165° C. and −180° C. and the nitrogen, oxygen and argon in a gaseous state, and preferentially adsorbing oxygen, said sodium zeolite A being a crystalline material having the following formula:

$$1.0 \pm 0.2 Na_2O : 1 Al_2O_3 : 1.85 \pm 0.5 SiO_2 : YH_2O$$

wherein "Y" in the hydrated form may be any value up to about 5.1 and which in its fully hydrated form has a density of 1.99 gm./cc.±0.1 gm./cc.

15. A method of purifying argon containing up to 0.1 part by volume of nitrogen and up to 14 parts by volume of oxygen per 100 parts by volume of argon, which method comprises providing a quantity of dehydrated sodium zeolite A, bringing said nitrogen, oxygen and argon into intimate contact with said sodium zeolite A while maintaining said sodium zeolite A at a temperature of between −165° C. and −180° C. and the nitrogen, oxygen and argon in a gaseous state, and preferentially adsorbing oxygen, under a pressure of not less than atmospheric, said sodium zeolite A being a crystalline material having the following formula:

$$1.0 \pm 0.2 Na_2O : 1 Al_2O_3 : 1.85 \pm 0.5 SiO_2 : YH_2O$$

wherein "Y" in the hydrated form may be any value up to about 5.1 and which in its fully hydrated form has a density of 1.99 gm./cc.±0.1 gm./cc.

16. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table A, bringing said nitrogen, oxygen, and argon into intimate contact with said sodium zeolite A while maintaining said sodium zeolite A at a temperature of below about −100° C. and said nitrogen, oxygen, and argon in a gaseous state, preferentially adsorbing oxygen, and after a time separating said sodium zeolite A from said other materials and removing from said sodium zeolite A at least a portion of the oxygen adsorbed thereby.

17. A method of purifying argon containing up to 0.1 part by volume of nitrogen and up to 14 parts by volume of oxygen per 100 parts by volume of argon, which method comprises providing a quantity of dehydrated sodium zeolite A, a crystalline sodium-aluminum-silicate having an arrangement of atoms such that the crystal's X-ray powder diffraction pattern is essentially the same as that tabulated in Table B, bringing said nitrogen, oxygen, and argon into intimate contact with said sodium zeolite A while maintaining said sodium zeolite A at a temperature of below about −100° C. and said nitrogen, oxygen, and argon in a gaseous state, preferentially adsorbing oxygen, and after a time separating said sodium zeolite A from said other materials and removing from said sodium zeolite A at least a portion of the oxygen adsorbed thereby.

18. A method of purifying argon containing up to 0.1 part by volume of nitrogen and up to 14 parts by volume of oxygen per 100 parts by volume of argon, which method comprises providing a quantity of dehydrated sodium zeolite A, bringing said nitrogen, oxygen and argon into intimate contact with said sodium zeolite A while maintaining said sodium zeolite A at a temperature of below about −100° C. and the nitrogen, oxygen and argon in a gaseous state, and preferentially adsorbing oxygen, said sodium zeolite A being a crystalline material having the following formula:

$$1.0 \pm 0.2 Na_2O : 1 Al_2O_3 : 1.85 \pm 0.5 SiO_2 : YH_2O$$

wherein "Y" in the hydrated form may be any value up to about 5.1 and which in its fully hydrated form has a density of 1.99 gm./cc.±0.1 gm./cc., and after a time separating said sodium zeolite A from said other materials and removing from said sodium zeolite A at least a portion of the oxygen adsorbed thereby.

19. In the adsorption of oxygen from a mixture of oxygen and argon, the improvement which comprises bringing said oxygen and argon mixture into intimate contact with a quantity of sodium zeolite A, a crystalline sodium-aluminum-silicate having an arrangement of atoms such that the crystal's X-ray powder diffraction pattern is essentially the same as that tabulated in Table A, and preferentially adsorbing oxygen from said mixture.

(References on following page)

References Cited in the file of this patent

UNITED STATES PATENTS

| | | |
|---|---|---|
| 1,682,588 | Weitzel et al. | Aug. 28, 1928 |
| 2,293,901 | Hutchinson | Aug. 25, 1942 |
| 2,306,610 | Barrer | Dec. 29, 1942 |
| 2,548,192 | Berg | Apr. 10, 1951 |

OTHER REFERENCES

Article in J. Am. Chem. Soc., vol. 65, pages 1253–62 (1943).

"Adsorption," by C. L. Mantell, McGraw-Hill Book Co., 1945, first edition, page 12 thereof.

"General College Chemistry," by Babor and Lehrman, 2nd edition, Thomas Y. Crowell Company, 1946, pages 152 and 257.